May 5, 1970  J. V. WERME  3,510,057
SIGNAL SCANNING DISCRIMINATOR
Filed May 19, 1967  2 Sheets-Sheet 1

INVENTOR.
JOHN V. WERME
BY
John F. Luhrs
ATTORNEY

United States Patent Office 3,510,057
Patented May 5, 1970

3,510,057
SIGNAL SCANNING DISCRIMINATOR
John V. Werme, Painesville, Ohio, assignor to Bailey Meter Company, a corporation of Delaware
Filed May 19, 1967, Ser. No. 639,810
Int. Cl. G05d 23/27; G01j 5/00; G11c 11/24
U.S. Cl. 236—1
5 Claims

ABSTRACT OF THE DISCLOSURE

A circuit for monitoring the true surface temperature of bar and strip metal during removal from a furnace or casting machine. A scanning circuit which discriminates between true surface temperature and false surface temperature caused by the presence of scale formations on the bar or strip material. This scanning circuit produces an electrical output signal representative of the peak true surface temperature occurring during a predetermined scan period.

CROSS-REFERENCES TO RELATED APPLICATIONS

U.S. Pat. to J. F. English, Jr. et al., Ser. No. 3,073,163.

BACKGROUND OF THE INVENTION

This invention relates to signal responsive devices and more particularly to a circuit for automatically selecting the peak electrical signal generated during a predetermined time interval.

FIELD OF THE INVENTION

In the iron and steel industry, the temperature of bar and strip, as it leaves the furnace or mold, must be closely monitored to establish control of the cooling rate of the material. It is, therefore, customary to monitor the material temperature by any one of a number of temperature sensitive transducers, the most popular transducer being the radiation pyrometer. One of the most important advantages of the radiation pyrometer is that no direct contact is necessary with the body at which the temperature is measured. Furthermore, the body may be either moving or stationary, a fact that makes the radiation pyrometer particularly adaptable to continuous industrial processing.

The purpose of a suitable radiation pyrometer is to convert the radiant energy from the heated body into a sensible indication of temperature. However, in the iron and steel industry, the body of material is often covered with formations of scale which shield the radiation-sensitive pyrometer from the radiant energy emitted by the true material surface, thus causing the pyrometer to transmit a signal which is representative of the scale temperature, which is considerably lower than the actual temperature of the material. Therefore, the temperature representative output signal of a radiation pyrometer, which is sensitive to both scaled and non-scaled surfaces of the heated material, is indicative of the average temperature of the material surface and is not a true indication of the actual temperature of the material.

The rate of cooling of a given material strongly influences the material's ultimate characteristics and quality; so it is, therefore, necessary to provide a means which will select the pyrometer signal which is indicative of actual material temperature so that the rate of cooling may be accurately controlled.

DESCRIPTION OF THE PRIOR ART

Instrumentation systems conventionally used for the measurement of heated body temperature leaving a furnace or mold consists of a series of radiation responsive devices indicating average body temperature. The number of radiation responsive devices employed is dictated by the physical size of the heated body.

The output signal of the radiation responsive device provides the control signal to regulate flow of spray water to maintain the heated body cooling rate within desired limits. The limits within which the cooling rate can be maintained is dependent on the accuracy of the actual temperature of the heated body.

The average temperature indication provided by conventional systems is appreciably affected by the presence of scale as noted in the previous discussion. Therefore, it is necessary for the operator to interpret this average temperature reading in the light of past experience to arrive at a probable actual temperature and then to make the necessary adjustments in cooling water flow to maintain the rate of cooling to the heated body within limits. The limits in this system are necessarily more broad than desired as a result of the inaccurate method of determining the actual body temperature.

The subject invention provides a means to select the actual heated body temperature, regardless of scale, during a period of time and provide a control output equal to actual body temperature which can be used to accurately control cooling rate of the heated body within desired limits.

SUMMARY OF THE INVENTION

The peak picking circuit provides a means to scan the output of a radiation responsive device indicating heated body temperature, update the output signal at incremental intervals in a predetermined time period, select the actual heated body temperature indication occurring during the time period and providing a control output signal during the time period which is indicative of the actual heated body temperature occurring during that period.

It is, accordingly, a principal object of this invention to provide an accurate indication of actual headed body temperature, regardless of scale, as a means to control the cooling rate of the heated body within desired temperature limits.

DESCRIPTION OF THE PREFERRED EMBODIMENT

Figure 1:
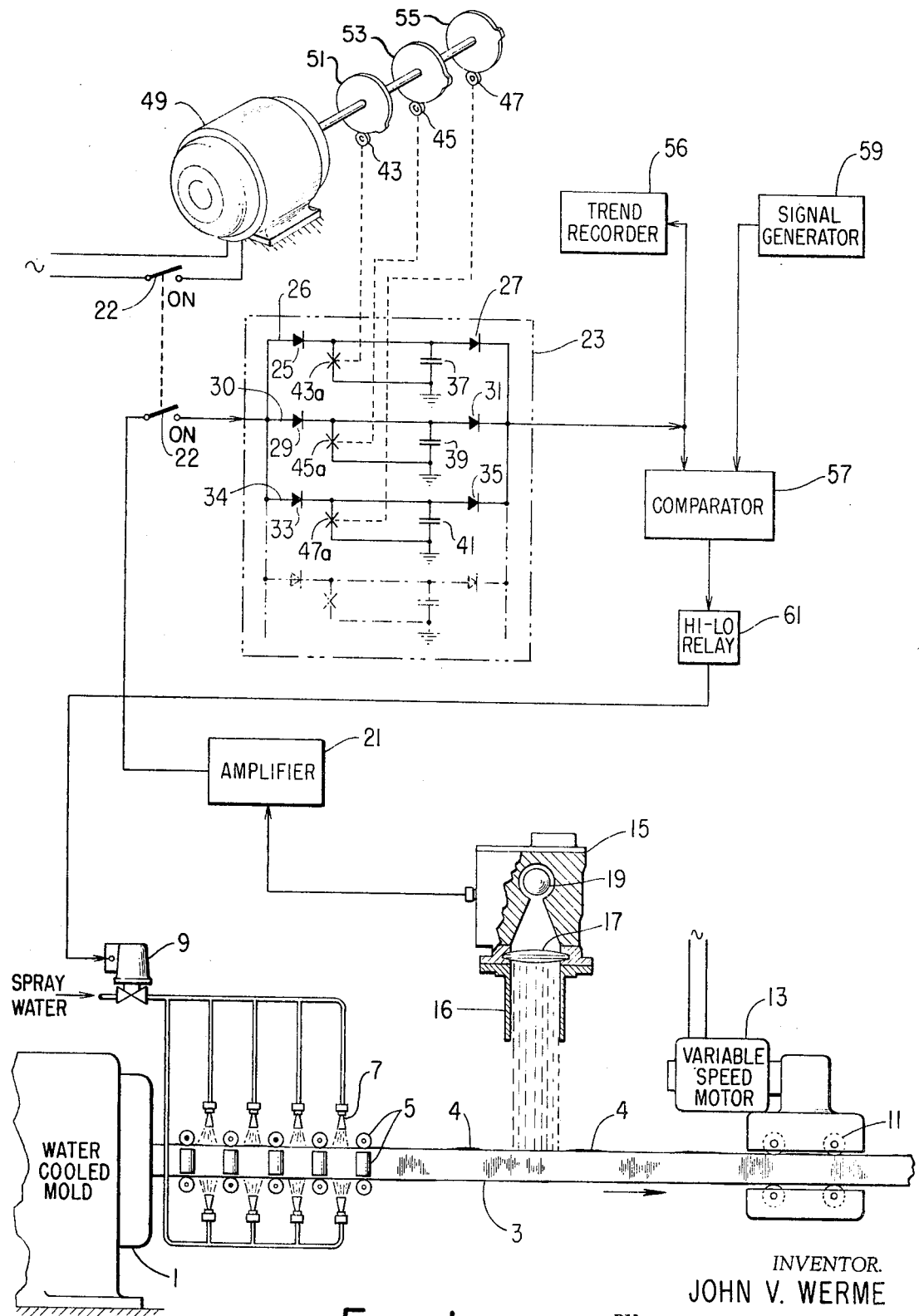
FIG. 1 is a schematic illustration of a control system incorporating my invention.

Referring to FIG. 1, I therein show a water cooled mold 1 of a conventional continuous casting machine having associated therewith a system of spray nozzles 7, a system of guide rolls 5 and a set of withdrawal rolls 11 which are activated by variable speed motor 13. The rotational speed of the withdrawal rolls 11, which is controlled by motor 13, determines the rate at which the bar material 3 is removed from the mold 1. The guide rolls 5 provide a means to contain the semi-molten material in the form of a square bar as it leaves the water cooled mold 1 while the water from spray nozzles 7 cool the surface of the bar to form a solid surface sufficient to contain the molten internal metal and prevent a collapse of the bar structure after it leaves the guide rolls. The flow of water through nozzles 7, which establishes the rate of cooling of the bar 3, is regulated by motor control valve 9. Accordingly, the structural characteristics of the bar material are a function of the cooling rate wherein an excessively fast rate of cooling will produce stress patterns in the material and an excessively slow cooling rate will result in structural collapse after the bar leaves the guide rolls 5. It is, therefore, necessary to monitor accurately the bar temperature after it leaves the guide rolls 5 so as to maintain the proper valve setting of valve 9 thus providing close control of cooling rate.

As previously described, the cooling process establishing a solid surface on the bar also results in the formation of a crust or scale on the surface of the bar which attenuates the radiant energy submitted by the bar thus resulting in a radiation level indicative of a temperature lower than the actual surface temperature of the bar. It has been determined by observation and experimentation that a given material produced by a given process will result in the formation of repetitive scaling patterns. This is especially true in the continuous casting process wherein the scaling pattern consists of like patterns of equal size. The ability to determine repetitive scaling patterns for a given material and process has enabled the development of a unique circuit which selects the temperature repersentative signal which indicates actual surface temperature and produces this signal as a control output, said signal being unaffected by the presence of a scale attenuated signal.

In FIG. 1, I show a radiation pyrometer 15 monitoring the radiant energy emitted by the metal bar 3 as it is drawn from the mold 1 by the withdrawal rolls 11. The radiation pyrometer may be of the type disclosed and claimed in U.S. Pat. to J. F. English, Jr., et al., Ser. No. 3,073,163. The location of the pyrometer 15 with respect to the bar 3 and the length and diameter of the sight tube 16 is determined as a result of the analysis of the repetitive scale formations. Having ascertained the scaling pattern, the field of view of the pyrometer is limited to a bar area which is less than the non-scaled bar surface area existing between scale formations. This positioning of the pyrometer 15 and sight tube 16 will insure a pyrometer output signal representaative of actual bar surface temperature during the time periods scale formations are not in the field of view of the pyrometer 15.

The radiant energy admitted by the sight tube 16 is collected by lens 17 which causes the energy to impinge on sensitive element 19. The radiation sensitive element 19 converts the radiant energy from the heated bar 3 into a signal which is proportional to temperature. The output signal from the pyrometer 15 is amplified in amplifier 21 and then applied as the input to peak picking circuit 23.

The peak picking circuit consists of a network of capacitor branches in parallel, each capacitor branch including a pair of isolating diodes and a set of switch contacts which, when activated, will short the capacitor causing the capacitor to discharge. The number of capacitor branches can vary depending on the desired system resolution. Peak picking circuit 23 consists of three capacitor branches 26, 30 and 34. Capacitor branch 26 consists of isolating diodes 25 and 27, capacitor 37 and normally open switch contacts 43a. Capacitor branch 30 consists of isolating diodes 29 and 31, capacitor 39 and normally open switch contacts 45a. Capacitor branch 34 consists of isolating diodes 33 and 35, capacitor 41 and normally open switch contacts 47a.

The normally open switch contacts 43a, 45a and 47a are caused to close momentarily in sequential order by the operation of cams 51, 53 and 55 of tripping switches 43, 45 and 47 respectively. The duration of the contact closure is a function of the cut of the cam and the gearing on motor 49 which rotates the shaft to which the cams are affixed. The gearing of motor 49 will determine the period to complete a switching sequence of the three switches 43, 45 and 47.

As previously discussed, the scaling pattern is predictable such that the maximum scale period can be expressed in units of time with respect to the preset withdrawal rate established by variable speed motor 13. Therefore, the maximum time period during which the pyrometer 15 will be viewing scale 4 is determinable.

The time for one complete switching sequence of switches 43, 45 and 47, as provided by gearing of motor 49, will be some time period greater than the maximum time period of a scale formation. The need for such a time cycle will become apparent in the subsequent discussions.

The control system is activated by placing switch 22 in the ON position thus applying power to motor 49 and permitting the output of amplifier 21 to serve as an input to peak picking circuit 23.

At time $T_0$, when switch contacts 43a, 45a and 47a are open, capacitors 37, 39 and 41 will charge to a value equal to the input signal; thus the output signal, which is equal to the voltage level of the highest charged capacitor of the parallel branches, will equal the input signal since all capacitors are charged to the same level. The output of the peak picking circuit serves as an input to trend recorder 56 and comparator unit 57. A second input to comparator unit 57 is provided by signal generator 59 which supplies a signal representing desired bar 3 temperature. The inputs to comparator 57 are compared and the unbalance between the peak picking circuit output signal and signal generator output establishes an output signal from comparator 57, the magnitude of which is the difference between the input signals. This output signal is an error signal which is applied to high low relay 61 where it is referenced to permitted limits of deviation. If the error signal exceeds either the high or low limit setting, a contact closure occurs which energizes the motor in motor control valve 9. The motor will respond by positioning valve 9 to correct the flow of cooling water to re-establish the cooling rate of bar 3 such that the output of peak picking circuit 23 will equal the desired temperature represented by the output of signal generator 59.

The discusion thus far has described a typical system operation so that the subsequent discussion of the operation of the peak picking circuit 23 will be more clearly understood.

Figure 2:
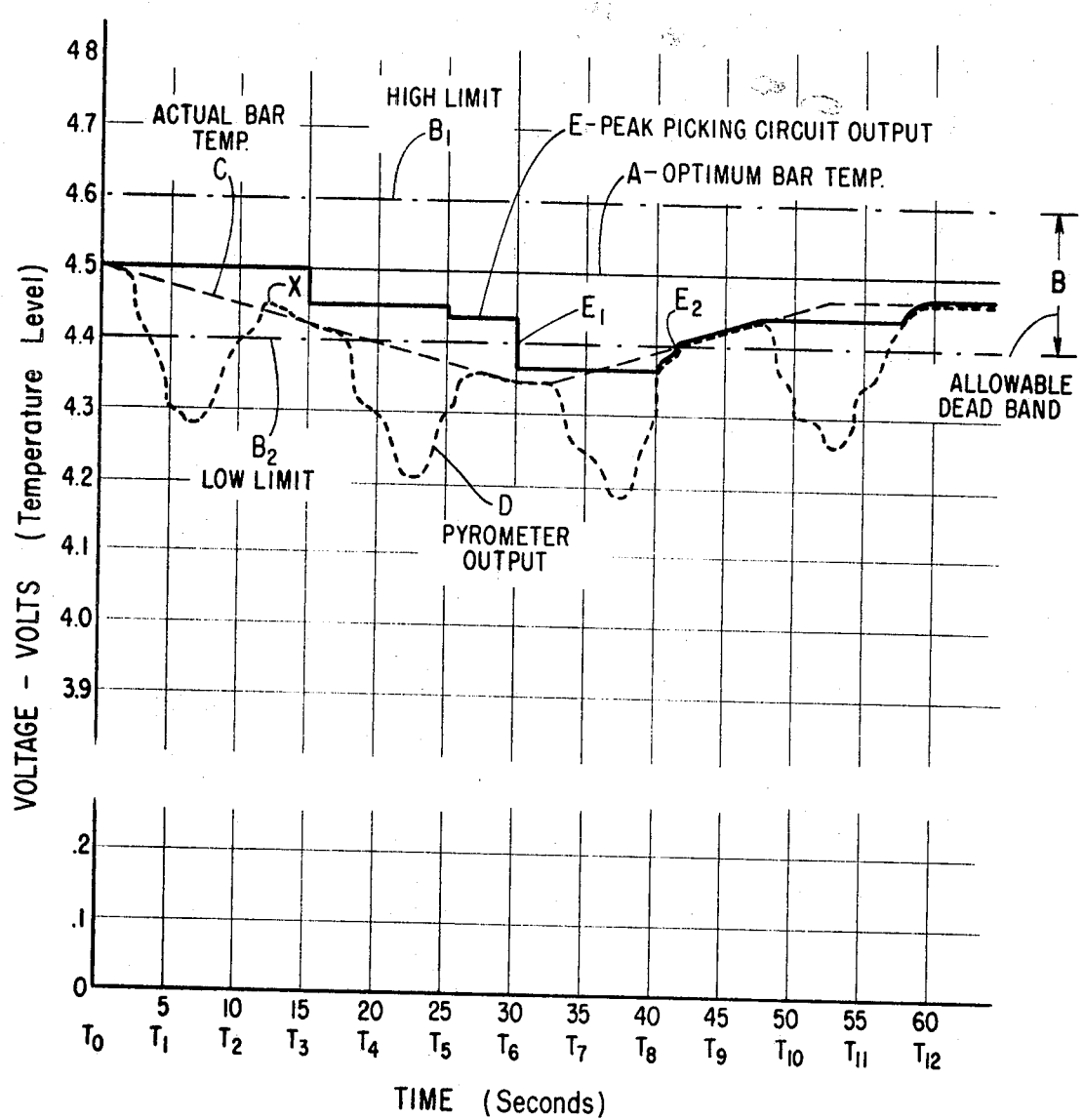
FIG. 2 is a graph illustrating the operation of the embodiment of FIG. 1.

A discussion with reference to FIG. 2 will establish the peak picking circuit as a means to provide an output signal which is representative of the actual bar temperature occurring during a preset period of time.

Referring now to FIG. 2, there is depicted a graph illustrating the operation of this control system. The ordinants of this graph are temperature, as represented by transducer electrical output in volts, while the abscissae are the time elapsed in the scan period. The duration of the scan period is established by the gearing in scan motor 49 such that the time for one revolution is greater than the time for the maximum scale formation to travel through the field of view of the radiation pyrometer. In a previous discussion, it was ascertained that the scale formations were determinable and this factor considered with the field of view of the pyrometer 15 and the withdrawal rate of bar 3, as established by motor 13, establishes a means of selecting the time of a scan period. It is necessary to establish a scan period which exceeds the maximum scale period so that, at a time during each scan period, the input to the peak picking circuit 23 will represent actual heated bar 3 temperature. The number of sub-periods in the scan period provides the resolution as each sub-period is established by the addition of a capacitor branch, cam and cam operated switch.

Assume, for the purpose of discussion, that the calculated scale period was less than 15 seconds and a preset scan period of 15 seconds was accomplished by gear motor 49. Equal sub-periods of 5 seconds were provided by three capacitor branches and associated switches as discussed previously.

Curve A of FIG. 2 represents the desired bar temperature as it passes within view of pyrometer 15. Curve A is indicative of the output of signal generator 59. The allowable dead band B established about curve A is represented by curves $B_1$ and $B_2$; the $B_1$ curve indicative of the high limit setting of high low relay 61 and $B_2$ curve indicative of the low limit setting of relay 61. Curve C represents the fluctuation in cooling rate of bar 3 as indicated by variation in actual bar temperature. This cooling rate fluctuation is caused by variation in the spray water pressure, the speed of motor 13 etc. Curve D represents the outputs of the pyrometer 15 before being applied to the peak picking circuit. Curve E represents the output of the peak picking circuit indicating the actual bar temperature that occurred during successive scan periods. The voltage level represented by curve E is the input signal to trend recorder 56 and comparator 57.

A detailed discussion of the peak picking circuit during the first scan period represented by time $T_0$ to time $T_3$ will serve as a basis for the general circuit discussion to follow.

At time $T_0$, when scan motor is energized and the radiation pyrometer output is applied as an input to circuit 23 by activating switch 22, the parallel branch capacitors charge to the voltage level of the circuit input signal, 4.5 volts, causing an output signal equal to the input signal. The effect this signal has on the cooling rate was discussed in the description of the control system in general. At time $T_1$, cam 51 causes switch 43 to close contacts 43a thereby shorting the capacitor 37 causing it to discharge to zero stored potential. This shunt of the capacitor 37 by contacts 43a is momentary and as cam 51 rotates, the contacts 43a open allowing capacitor 37 to assume the voltage level of the input signal at time $T_1$, 4.3 volts. However, the isolating diodes in each branch prevent a flow of current between the branches, thus each branch maintains its stored potential. Therefore, the output of circuit 23 will remain at 4.5 volts, the potential of capacitors 39 and 41.

At time $T_2$, cam 53 will cause switch 45 to close contacts 45a momentarily causing capacitor 39 to discharge and then assume the input voltage level of 4.4 volts. The potential charge on capacitor 37 will now also be 4.4 volts as a result of the input signal level increasing in potential. It is readily understood that the capacitors will follow any increase in input potential while being unaffected by a decrease until shorted by their respective switch contacts. The output of circuit 23 will remain 4.5 volts, however, since the output is equal to highest potential level of the parallel capacitors and capacitor 41 remains charged to 4.5 volts.

At time $T_3$, cam 55 will cause switch 47 to close contacts 47a, momentarily causing capacitor 41 to discharge and then assume the input voltage of 4.42 volts. The output of circuit 23 will now be equal to the charge potential of capacitors 37 and 39 which have assumed the input potential of 4.45 volts as apparent from curve D. This change in actual bar temperature is represented by the step drop of curve E from the initial actual bar temperature represented by a radiation pyrometer output drop from 4.5 volts at $T_0$ to 4.45 volts at $T_3$, the end of a scan period. The scan periods are repeated and the capacitor branches are sequentially shorted as discussed causing the output of circuit 23 to be updated every 5 seconds and producing an output which is representative of the actual bar temperature. The dead band B established by high low relay 61 and represented by curves $B_1$ and $B_2$ prevent oscillation of the control system as evinced by constant change in position of valve 9. The slope of curve C indicates a decrease in the actual temperature of bar 3 while curve E represents this decrease in temperature as a decrease in the output of peak picking circuit 23. At point $E_1$, the voltage level of circuit 23 output falls below the low level limit established by high low relay 61 causing a contact closure in the motor circuit of motor control valve 9. This contact closure energizes the valve motor and positions the valve such that less water is permitted to enter the spray nozzles 7. This reduction of water flow reduces the rate of cooling of bar 3 and thus raises the actual bar temperature to an acceptable level. The positioning of valve 9 continues until the actual bar temperature returns to an acceptable level as indicated by point $E_2$ on curve E, at which time the contacts to the motor circuit of valve 9 are open.

The operation of the peak picking circuit has thus ignored the radiation pyrometer's sensitivity to the low temperature scale 4 and provides a method of monitoring the actual bar temperature over successive scan periods. In addition to recording said peak temperatures, the circuit provides a control signal to correct for fluctuation in cooling rate of bar 3.

The embodiment discussed merely indicates one application for such a peak picking circuit and in no way is considered to limit its application. Likewise, the use of mechanical switching in the capacitor branches was selected as illustrating a switching method well known in the art. A sequential switching circuit could readily be provided by conventional solid-state devices.

What I claim as new and desire to secure by Letters Patent of the United States is:

1. A signal scan and discriminator system for regulating the cooling rate of a non-uniformly heat radiating work piece moving through a cooling medium, comprising:

means for sensing the heat radiated from a preselected span along the work piece, said sensing means outputting a voltage signal directly proportional to the temperature of the radiation emating therefrom;

a circuit having a signal input terminal and a signal output terminal, said circuit input terminal being energized by said voltage signal, said circuit including, a plurality of signal storage circuits connected in parallel between said input and output terminals, said signal storage circuits each including a capacitor adapted to be discharged toward ground potential within a scan period for said circuit, said capacitors being concurrently charged to the peak input signal occurring during the interim between successive periodic discharges of each said capacitor, means for isolating the charge on each capacitor from the charge on the remaining said capacitors, and means for sequentially discharging each said capacitor in said plurality toward ground potential in each scan period, the discharge time being relatively short with respect to the scan period so that at least one of said capacitors is charged to the peak signal that has occurred during the scan period to provide a corresponding output signal on said terminal; and means responsive to the output signal, for controlling the flow of coolant supplied to the work piece and for maintaining the cooling rate of the work piece within a predetermined temperature range substantially independent of the radiation variations from the work piece caused by scale formed during the cooling operation.

2. The control system of claim 1, wherein said coolant control means includes:

means for generating a direct current voltage reference signal having a preselected amplitude, said reference signal forming a set point for coolant flow;

means for comparing the reference signal with the output signal representative of the peak input signal for the scan period, said comparing means outputting an error control signal proportional to deviations from the reference signal; and means, responsive to the error control signal, for valving the rate of flow of coolant to the work piece.

3. A signal scan and discriminator apparatus for establishing an output signal representative of a peak input signal occurring during a scan period, comprising:

an input terminal;

an output terminal;

a plurality of signal storage circuits connected in parallel between said input and output terminals, said signal storage circuits each including a capacitor adapted to be discharged toward ground potential within each scan period, said capacitors being concurrently charged to the peak input signal occurring during the interim between successive periodic discharges of each said capacitor;

means for isolating the charge on each capacitor from the charge on the remaining said capacitors;

means for sequentially discharging each said capacitor in said plurality toward ground potential in each scan period, the discharge time being relatively short with respect to the scan period so that at least one of said capacitors is charged to the peak input signal that has occurred during the scan period to provide a representative output signal.

4. An apparatus according to claim 3, wherein said isolating means for each capacitor includes a pair of unidirectional devices each having an anode element and cathode element, the anode element of one said device and the cathode element of the other said device being connected to said capacitor and one remaining element being connected to said input terminal and the other remaining element being connected to said output terminal.

5. An apparatus according to claim 4, wherein said sequential discharging means includes a normally open switch connected across each of said capacitors to ground and means for cyclically closing said switches at a predetermined rate so that each of said capacitors are discharged toward ground potential once during the scan period.

References Cited

UNITED STATES PATENTS

| | | | |
|---|---|---|---|
| 2,725,471 | 11/1955 | Appleton et al. | 340—173 |
| 2,966,641 | 12/1960 | McCoy | 340—173 X |
| 3,067,939 | 12/1962 | Ziffer | 235—183 |
| 3,074,641 | 1/1963 | Baker | 235—183 |
| 3,093,815 | 6/1963 | Karnaugh | 340—173 |
| 3,344,262 | 9/1967 | Pryor | 328—151 X |

OTHER REFERENCES

Chittenden, D. M., et al.: "Sampling Control for Analog Waveform Analyzer," IBM TDB, vol. 9, No. 6, November 1966, pp. 602, 603.

BERNARD KONICK, Primary Examiner

J. F. BREIMAYER, Assistant Examiner

U.S. Cl. X.R.

73—339, 355; 266—6; 320—1